US008882598B2

(12) United States Patent
Willis et al.

(10) Patent No.: US 8,882,598 B2
(45) Date of Patent: Nov. 11, 2014

(54) PEERING SYSTEM FOR GAMING SERVICE PROVIDERS

(75) Inventors: Daniel Willis, Stittsville (CA); Dhananjay Godse, Kanata (CA)

(73) Assignee: Google Inc., Mountain View, CA (US)

( * ) Notice: Subject to any disclaimer, the term of this patent is extended or adjusted under 35 U.S.C. 154(b) by 1883 days.

(21) Appl. No.: 11/522,948

(22) Filed: Sep. 19, 2006

(65) Prior Publication Data

US 2007/0010332 A1 Jan. 11, 2007

Related U.S. Application Data

(63) Continuation of application No. 10/324,025, filed on Dec. 20, 2002, now abandoned.

(51) Int. Cl.
*A63F 13/12* (2006.01)
*A63F 13/30* (2014.01)

(52) U.S. Cl.
CPC ............ *A63F 13/12* (2013.01); *A63F 2300/50* (2013.01); *A63F 2300/407* (2013.01)
USPC .............................................. 463/42; 463/41

(58) Field of Classification Search
CPC ............... A63F 13/12; A63F 2300/40; A63F 2300/402; A63F 2300/403; A63F 2300/50; A63F 2300/51; A63F 2300/513; A63F 2300/5533
USPC .............................. 463/42, 25, 29, 40–4, 292
See application file for complete search history.

(56) References Cited

U.S. PATENT DOCUMENTS

| | | | |
|---|---|---|---|
| 5,586,257 A | | 12/1996 | Perlman |
| 5,791,992 A | * | 8/1998 | Crump et al. .................... 463/41 |
| 5,956,485 A | | 9/1999 | Perlman |
| 6,061,722 A | * | 5/2000 | Lipa et al. ...................... 709/224 |
| 6,134,598 A | | 10/2000 | Raman |
| 6,306,035 B1 | | 10/2001 | Kelly et al. |
| 6,315,668 B1 | * | 11/2001 | Metke et al. .................... 463/42 |
| 6,884,172 B1 | | 4/2005 | Lloyd et al. |
| 2002/0143867 A1 | * | 10/2002 | Horikawa ...................... 709/203 |
| 2003/0050113 A1 | * | 3/2003 | Leen et al. ...................... 463/25 |
| 2004/0015608 A1 | | 1/2004 | Ellis |

OTHER PUBLICATIONS

Seganet Review, by Mike O'Toole, online article, http://denvervideogames.tripod.com/gamershowto/id10.html, May 3, 2001 edition, pp. 1-6.*

Xbox Live—Broadband Providers Ready!, by Utah Saint, online article http://www.xbox365.com/news.cgi?id=EpFypkFFuphLzSblsl3340, Oct. 30, 2002, pp. 1-3.*

* cited by examiner

*Primary Examiner* — Jasson Yoo
(74) *Attorney, Agent, or Firm* — Fish & Richardson P.C.

(57) ABSTRACT

A distributed loosely coupled unified on-line gaming system comprises a central service provider, gaming service customers providing gaming service customer located equipment connected to the central service provider through a broadband network, and gaming service providers connected to the central service provider through the broadband network. The different gaming service customers are connected to different gaming service providers. A method for providing a distributed loosely coupled unified on-line gaming service comprises the steps of connecting a plurality of gaming service customers and a central service provider through at least a broadband access network, connecting gaming service providers and the central service provider through a broadband access network, establishing a connection between gaming service customers and the plurality of gaming service providers through the central service provider, and establishing multi-customer interactions between the gaming service customers through the central service provider.

14 Claims, 3 Drawing Sheets

PEERING SYSTEM FOR GAMING SERVICE PROVIDERS

This application is a continuation of U.S. patent application Ser. No. 10/324,025 filed Dec. 20, 2002. The entire contents of U.S. patent application Ser. No. 10/324,025 filed on Dec. 20, 2002 are hereby incorporated by reference.

FIELD OF THE INVENTION

The present invention generally relates to interactive gaming systems, and more specifically to on-line gaming systems wherein a central service provider coordinates services of different gaming service providers.

BACKGROUND OF THE INVENTION

Since its origins dating back to the early seventies of the last century, computer gaming did not only undergo a period of substantial growth, but also dramatically changed its role in social interactions and interpersonal relationships. In our modern world, the computer gamer is no longer an isolated and introverted individual, but is part of a rich and active community of like-minded people. In recent times, the ongoing developments in the field of computer gaming led to the creation of new and exciting markets, as for example on-line computer gaming. The rapid expansion of the Internet network, which by now has achieved the status of an almost omnipresent medium, provides not only the basis, but also the boost for the constant developments in on-line computer gaming.

During the last couple of years, on-line computer gaming has gained increasing popularity, and today thousands of gamers are playing on-line all around the world. Many people stereotype this group as techno kids only, but this could not be more wrong. Both females and males of all ages can be found daily trying to out-think, out-maneuver, or just having a good time on-line. On the Eve of the Electronic Entertainment Expo (E3Expo), the world's largest trade event showcasing computer and video games and related products, a new survey by Peter D. Hart Research Associates, Inc., has found that three-in-five Americans age six or older, or about 145 million people, say they routinely play computer or video games, and that nearly half of these game players are female. Predictably, interactive on-line computer gaming will blur the line between games and other entertainment or communication media, and the avenues explored in the development of on-line gaming might well break new ground for interactive Internet applications in all areas of business relations and social life.

One of the prerequisites for on-line gaming is the appropriate hardware, including a gaming console. Various gaming consoles have been developed for on-line gaming, and Microsoft's Xbox, Sony's Playstation 2, Nintendo's Gamecube, Sega's Dreamcast console all are major players on the on-line gaming market. Also, different Gaming Service Providers (GSP) are by now well established, the GSP offering a plethora of on-line games, and providing the subscriber with access to a gaming community for interactive group-play. Further, different networks are presently devoted to on-line gaming, Sega's SegaNet being an example of a network dedicated exclusively to on-line gaming.

The diversity observed in the on-line gaming market, however, restricts an on-line gamer to a certain group of gaming participants. In many cases the different gaming consoles, the different gaming service providers, and the different networks are not compatible among each other. Often, people with whom a gaming interaction is sought, are not available to an on-line gamer, since they are subscribing to different providing services. Therefore, the community of all on-line gamers is divided into different subgroups, which are independent from each other, and between which communication is normally not possible.

It would be advantageous to provide a system that allows communication between users subscribing to different GSP, and using different gaming hardware. This way, the gaming community available to an on-line gamer is substantially expanded, and the positive impact possibly executed by on-line gaming is strongly and emphatically enhanced through this unifying approach to on-line gaming.

OBJECT OF THE INVENTION

It is therefore an object of the present invention to provide a system which offers a unifying approach to on-line gaming, and which allows different on-line gamers using different gaming hardware and subscribing to different gaming service provider, to interact in an on-line gaming scenario.

SUMMARY OF THE INVENTION

According to an aspect of the instant invention, there is provided a method for providing a distributed loosely coupled unified on-line gaming service system. The method comprises the steps of connecting a plurality of gaming service customers and a central service provider through at least a broadband access network, connecting a plurality of gaming service providers and the central service provider through the at least a broadband access network, establishing a connection between the plurality of gaming service customers and the plurality of gaming service providers through the central service provider, and establishing multi-customer interactions between the plurality of gaming service customers through the central service provider. The different gaming service costumers out of the plurality of gaming service customers are connected to different gaming service providers out of the plurality of gaming service providers.

According to another aspect of the instant invention, there is provided a distributed loosely coupled unified on-line gaming system comprising a central service provider, a plurality of gaming service customers providing gaming service customer located equipment connected to the central service provider through at least a broadband network, and a plurality of gaming service providers connected to the central service provider through the at least one broadband network. The different gaming service costumers out of the plurality of gaming service customers are connected to different gaming service providers out of the plurality of gaming service providers.

BRIEF DESCRIPTION OF THE DRAWINGS

An exemplary embodiment of the present invention will be described in conjunction with the following drawings, in which similar reference numbers designate similar items.

DETAILED DESCRIPTION OF THE INVENTION

The present invention is now described with respect to a specific embodiment thereof, in which a gaming link architecture is used to provide a unifying interactive gaming system service. Of course, the invention described herein is not restricted to a particular example, which will be illustrated in what follows, but equally applies to other architectures possibly used to establish and provide a unified on-line gaming scenario.

Figure 1:
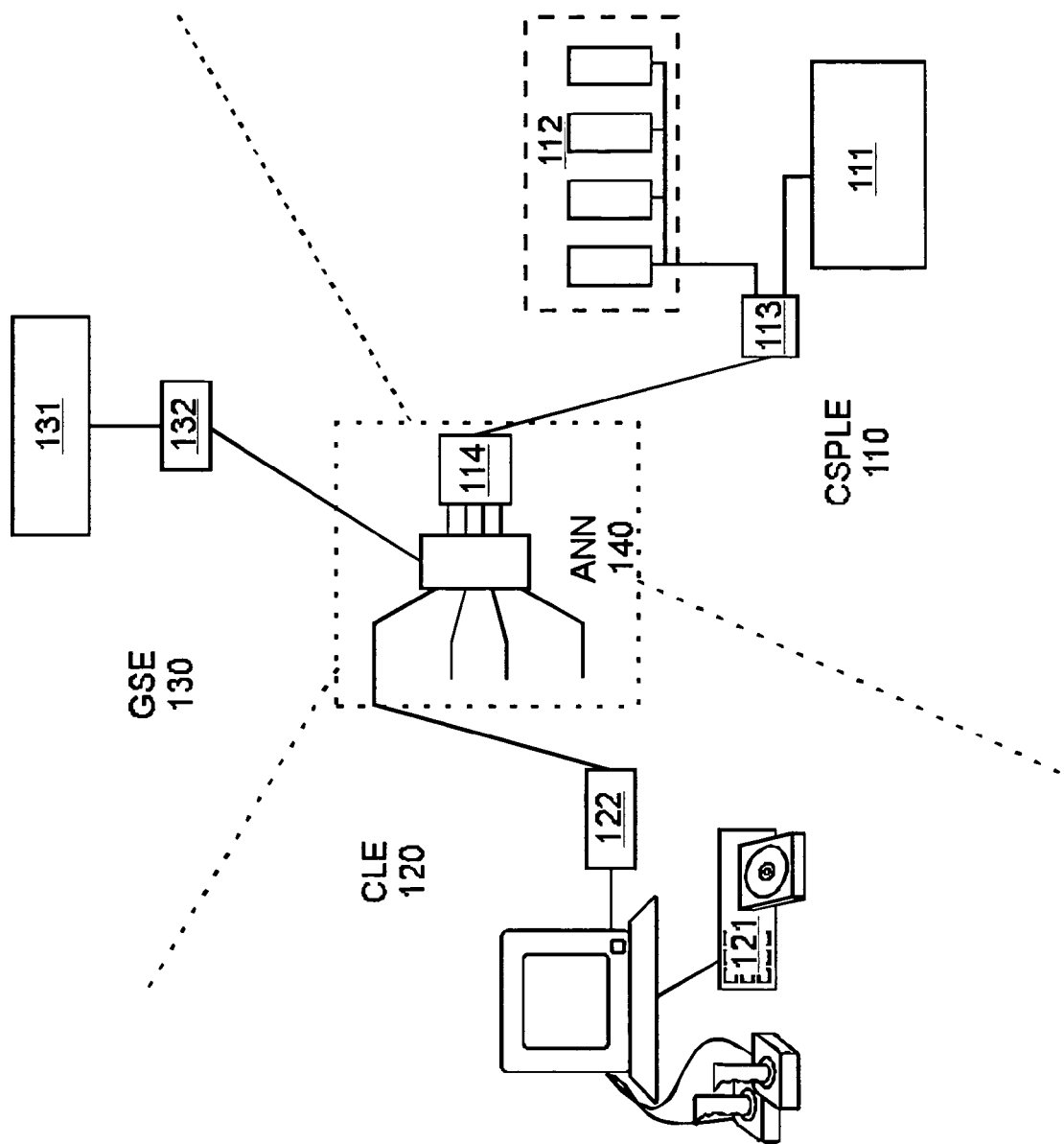
FIG. 1 displays a schematic diagram of an on-line gaming architecture.

Referring to FIG. 1, a schematic diagram of the gaming link architecture for providing a distributed loosely coupled and unified on-line gaming environment is presented. The term distributed loosely coupled unified on-line gaming environment refers to independent gaming service providers in communication with each other, linked together to create a larger gaming universe. The main components of the gaming architecture are a central service provider site containing central server provider located equipment CSPLE 110, a customer site containing customer located equipment CLE 120, and at least one gaming service provider site containing gaming service provider equipment GSPE 130. Preferably, more than one gaming service provider are part of the gaming link architecture. Further, an access aggregation network AAN 140 connects the different sites, and establishes communication between CSPLE 110, CLE 120 and GSPE 130. On the CSPLE site 110 there is located a gaming service provider network GSP 111, a management network 112 utilizing a access provider operations support systems AP-OSS 113, a router 113 and a head-end 114, establishing the connection to the ANN 140, among other components. The customer located equipment CLE 120 includes a gaming consol GC 121 and other hardware components necessary for playing a game, such as a monitor, joysticks, and the like. Further, CLE 120 includes a modem 122 for establishing the connection to the AAN 140. The modem 122 is for example a broadband access modem, a cable modem, a satellite modem, or any other type of modem. The gaming service provider equipment GSPE 130 essentially contains gaming service support systems 131 for providing gaming data, gaming software, and the like, and a head end 132 for establishing a connection to the AAN 140. Optionally, the GSPE 130 is structured in an analogous way to the CSPLE 110, allowing for a same approach in gaming data and gaming customer management. The access aggregation network ANN 140 generally is a wide area network WAN, and preferably a broadband access network BAN.

Figure 2:
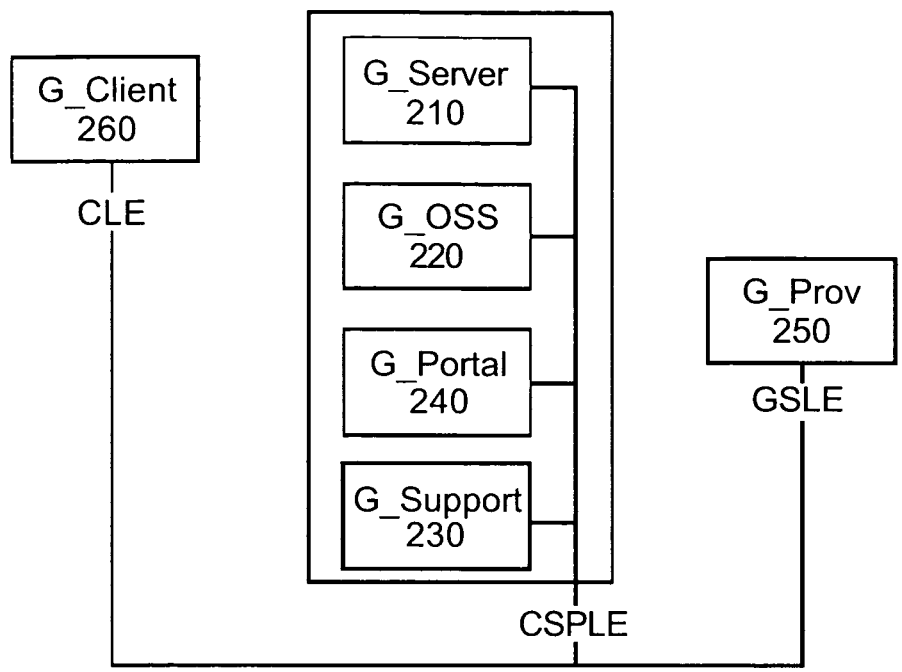
FIG. 2 displays a schematic diagram of an on-line gaming software architecture.

Referring now to FIG. 2, a schematic diagram is shown, illustrating the basic elements of the software architecture used in providing an on-line gaming environment. On the CSPLE site there is a gaming server G_server 210, an operations support systems engine G_OSS 220, support services G_support 230, and a gaming portal G_portal 240

The purpose of the gaming server G_server 210 is to provide the connectivity and registration services for gaming consoles (GC), and to manage the registered devices. Typically, G_server 210 deals with console discovery, client registration, subscriber authentication, console address management, as well as optionally Internet protocol (IP) connectivity management and proxy for gaming consoles (GC). G_server 210 manages the different GC and different subscribers being part of the distributed loosely coupled unified on-line gaming architecture. Further, G_server 210 deals with connection qualification services for consoles, with bundled instrumentation, performance, and customer management.

The purpose of the operation support systems engine G_OSS 220 is to provide an application program interface (API) to tie-in with the network service provider's software engines for subscriber authentication, notification, and billing functionalities. Preferably, G_OSS 220 supports multiprotocol API, containing common utilities with plug-in adapters to facilitate connectivity to a majority of other operation support systems (OSS), the plug-in adaptation cartridges supporting Hyper Text Transfer Protocol (http), Simple Network Management Protocol (SNMP), eXtensible Markup Language (XML), JAVA™ and the like. Also, G_OSS 220 adds, modifies, or deletes a registered gaming (GC) console or a subscriber to the on-line gaming service, and takes care of billing and service notification, among other related functionalities.

The system of support services G_support 230 fulfills functions such as running a dynamic host configuration protocol, Web servicing, platform and application management, subscriber management, license servicing, and the like. Among the system of support services, there are a dynamic host configuration protocol server, a Web server, as well as a registration server, and other services.

The purpose of the gaming portal G_portal 240 is to provide a site for net-based gaming services. It also acts as a proxy site through which net-based game content providers offer content and services to the user of the gaming console (GC). G_portal 240 provides an entry point into the on-line gaming network for game specific servers, for connection servers enabling group gaming, head-to-head services and find-a-friend scheduling, for bulletin boards and chat rooms, as well as for gaming sites and news proxy. G_portal 240 not only handles interaction between customers of one given GSP, such as the ones outlined above, but further establishes communication between customers of different gaming service providers. Whereas G_server 210 mainly deals with client or subscriber related issued, G_portal 240 mainly handles provider-related tasks.

Central to the instant invention is a cooperative interaction between G_portal 240 and G_server 210. For example, G_portal 240 receives a connection request from G_server 210 that a certain customer or gamer $\Gamma_1$ connected to the unified on-line gaming architecture searches communication with her or his gaming service provider (GSP) $\Pi_1$, and establishes the proper connection. In a standard on-line gaming scenario, an individual GSP offers a list of possible contacts available for interactive gaming to its individual subscribers. When for example a certain customer $\Gamma_1$ wishes to participate in on-line gaming, and wishes to play a violence-free game, which further challenges her or his combinatorial skills, a selection of possible gaming partners interested in a same gaming scenario is presented to the user. The list is compiled by the customer's $\Gamma_1$ individual GSP $\Pi_1$. In the distributed loosely coupled unified gaming link architecture according to the present invention, G_portal 240 compiles a list of all individuals connected to their GSP through the central gaming service provider. Also, G_portal not only keeps a record of all gamers connected to the distributed loosely coupled unified on-line gaming architecture, but optionally associates personal gaming attributes with each on-line gamer connected. Thus, when a particular on-line gamer $\Gamma_1$ wishes to enroll in group gaming, not only a list of possible participants connected to his or her gaming service provider $\Pi_1$ is offered to $\Gamma_1$, but a list of all customers connected to the distributed loosely coupled unified on-line gaming architecture. This list is compiled by G_portal 240 being in communication with the different GSP, is made available by G_portal 240 to G_server 210, taking care of client registration, and offered by G_server 210 to all clients connected through the unified gaming network through G_server 210.

Also, G_portal 240 provides the possibility to tie into the gaming link architecture services offered by other providers accessible to a user of the gaming console, such as for example services provided by the hospitality industry. Optionally, G_portal 240 offers possibilities such as pay-per-play services, advertising, download services, and others. Although designed as an on-line gaming environment, G_portal 240 enables one to extend the uses of a plurality of gaming consoles (GC) interconnected through a broadband access network beyond gaming and entertainment.

With further reference to FIG. 2, on the GSLE site there is a system of gaming provider services G_prov 250. G_prov 250 handles tasks such as client administration, game management, and related tasks. Preferably, the services on the GSLE site are structured in analogy to the services on the CSPLE site.

There exist different possibilities to realize a central service provider, associated with the CSPLE site. According to one embodiment of the instant invention, the central service provider is a real entity, comprising its own physical components. In this case, different gaming service providers are connected via a master gaming service provider, the real central service provider. Optionally, one gaming service provider out of a plurality of gaming service providers functions as the real central service provider. In another embodiment, the central service provider is a virtual entity. A process of G_portal 240 peering essentially establishes the concept of a virtual central service provider. As mentioned above, services on the GSLE site are structured in analogy to services on the CSPLE site. In case of a virtual central service provider, hardware components of the GSLE site are identified as the same hardware components of the CSPLE site. The concept of a virtual central service is established by equal participation of different gaming service providers through a peering process. Different gaming service providers simultaneously realize concepts for GSLE as well as CSPLE. All gaming service providers have same equal rights, and a same importance ranking. Through a process of portal peering, and through an extensive G_portal 240 to G_server 210 cooperative interaction, for given groups of users of gaming service providers, there exists a possibility not only for intramultitudinal communication, but also for intermultitudinal communication.

Referring back to FIG. 2, the main component on the CLE site is a gaming client G_client 260. The purpose of the gaming client G_client 260 is to provide the gaming console with services, such as establishing connectivity and registration. G_client 260 comprises a registration client, an authentication client, a console address management module, and a module for enabling connectivity and service to a the central service provider. G_client 260 supports established methods for data communication and transfer. Further, G_client 260 adapts to a particular hardware realization for equipment of the CSPLE site 110. There exist different solutions to the problem of choosing an ideal G_client 260 for a gaming environment. Typically, gaming consoles (GC) have a limited, flat memory space. On the other hand, a highly functional client is required, to be co-resident with the primary application in the gaming console (GC), the primary application typically being an on-line computer game.

Figure 3A:
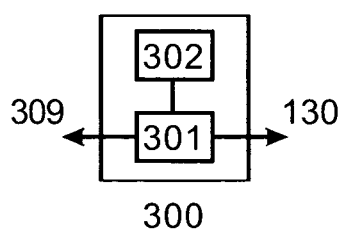
FIG. 3a displays a schematic diagram of a gaming console having a restricted kernel and a flat memory space.
Figure 3B:
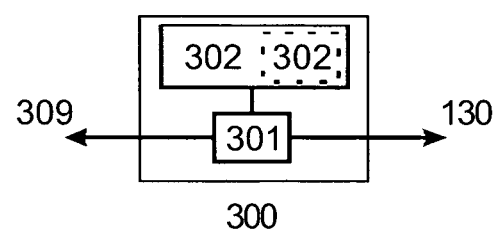
FIG. 3b displays a schematic diagram of a gaming console having a restricted kernel, a flat memory space; and a highly functional client incorporated into the flat memory space.
Figure 3C:
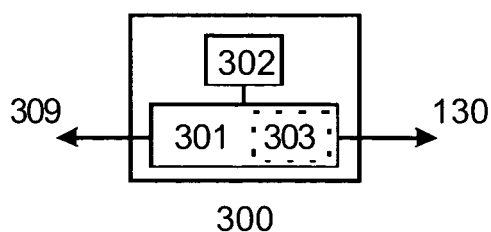
FIG. 3c displays a schematic diagram of a gaming console having a restricted kernel, a flat memory space; and a highly functional client incorporated into the restricted kernel.
Figure 3D:
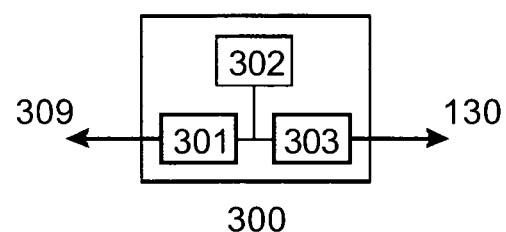
FIG. 3d displays a schematic diagram of a gaming console having a restricted kernel, a flat memory space; and a highly functional client residing in non-volatile random access memory.

Referring now to FIG. 3a, a schematic diagram of the architecture of a GC 300 is shown. The gaming console comprises a restricted kernel 301 and a flat memory space 302. The restricted kernel is in connection with the gaming console's hardware 309, as well as with the flat memory space 302. Optionally, when the gaming console is used for on-line gaming, the restricted kernel 301 is in connection with the access aggregation network 130. The flat memory space typically comprises one single software application, namely a video game, or other gaming software. In order to install a highly functional client 303 on the GC, the client 303 is optionally integrated into the gaming software, and loaded together with the gaming software into the flat memory space 302. This solution is illustrated in the schematic diagram shown in FIG. 3b. However, in this set-up, changes in client modification require changes in the gaming software package. Another solution is to integrate the highly functional client 303 into the restricted kernel 301. This solution is illustrated in the schematic diagram shown in FIG. 3c. However, in this set-up two competing application are run in the restricted kernel 301, namely the gaming software and the highly functional client 303. This most likely has a negative effect on the gaming performance of the GC. A third solution, especially useful in connection with a broadband access network, is to dedicate a small random access memory (RAM) to the highly functional client 303, thus leveraging a high bandwidth connection to the gaming console, and using it to care and feed a highly functional client 303. This solution is shown in FIG. 3d. Typically, the highly functional client 303 is an ultra-thin client UTC.

As an advantage of this architecture, the gaming client G_client 260 becomes very scalable and flexible, and is growing outside the GC without impacting the footprint occupied within the GC. Also, client code portability between different gaming platforms is highly simplified. This way, G_client 260 provides an adaptive platform for a consistent gaming environment, suitable for the use within a distributed loosely coupled unified on-line gaming system.

Figure 4:
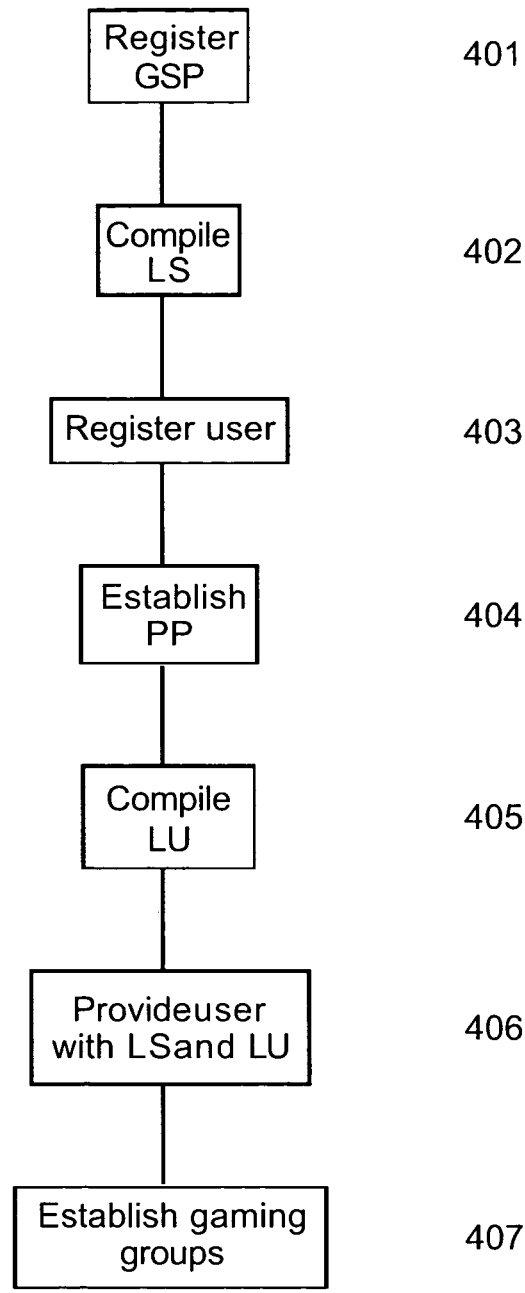
FIG. 4 shows a flow chart illustrating a method for providing a distributed loosely coupled unified online gaming system according to the instant invention.

Referring now to FIG. 4, a flow chart is shown illustrating a method for providing a distributed loosely coupled unified online gaming system. In a first step 401 the different gaming service providers are registered. Preferably, G_portal handles the GSP registration. G_portal then compiles a list of services LS offered by all registered GSP, step 402. Alternatively, a module other than G_portal compiles the list. The list includes all different gaming services offered by the registered GSP, besides other information. Next, a user of the distributed loosely coupled unified on-line gaming system is registered, step 403, handled by G_server. In step 404, G_server establishes a personal profile PP for a registered user. In the simplest case, no personal information at all is added to the personal profile. Optionally, user information provided by G_client is entered into the personal profile for a given user. Further optionally, a user is prompted after registration for personal data regarding gaming situations. In step 405, a list of all users LU registered with the distributed loosely coupled unified on-line gaming service is compiled. Alternatively, an existing list of users is updated when a new user connects to the distributed loosely coupled unified on-line gaming system. Each user is then provided with a list of possible gaming partners and gaming services available step 406. By a process of individual selection made by the registered users, different gaming groups are established between the users connected to the distributed loosely coupled unified on-line gaming service, step 407.

According to another aspect of the instant invention, G_portal and G_client also allow for gaming communication between users using different gaming hardware, and between users and gaming service providers (GSP), the GSP supporting different gaming data formats. Optionally, G_server and G_portal perform a suitable data conversion For example two customers or gamers $\Gamma F_1$ and $\Gamma_2$ are connected to the central service provider, and are subscribers of services provided by the gaming service providers $\Pi_1$ and $\Pi_2$, respectively. The gaming data provided by $\Pi_1$ to $\Gamma_1$ are adapted to certain hardware facilities available to $\Gamma_1$. A similar communication is established between $\Pi_2$ and $\Gamma_2$. In a classical on-line gaming situation, there is no interaction possible between customers $\Gamma_1$ and $\Gamma_2$, nor is an interaction possible between $\Gamma_1$ and $\Pi_2$ or $\Gamma_2$ and $\Pi_1$ since each GSP operates their own gaming link architecture, and adheres to its own data format. According to an aspect of the instant invention, all customers of one particular gaming service provider are able to interact with customers being connected not only to their own GSP, but with customers of any GSP being part of the distributed loosely coupled unified on-line gaming system. This is possible, since all customers are connected to their gaming service provider through the central service provider. Also, since G_client and G_portal allow for the possibility of data adaptation and data conversion, services offered by a particular gaming service provider are possibly accessible by all customers connected to the distributed loosely coupled unified ion-line gaming system. G_portal and G_client further register gaming requests issued by a certain customer, to allow for a proper billing of services offered by individual gaming service providers.

The personal profile established in step 404 also allows for a filtering process of certain gaming requests. For example, a gamer $\Gamma_1$ only wants to play with people registered with the gaming service providers $\Pi_1$ and $\Pi_3$, but not with customers of $\Pi_2$. G_portal and G_client set up registered user lists accordingly, and when a list of possible play partners is offered to customer $\Gamma_2$, who is registered with $\Pi_2$, user $\Gamma_1$ is excluded from this particular list.

Similar considerations hold for the list of possible services offered to a user. If a gamer $\Gamma_1$ only wants to play non-violent games, the services offered by the gaming service provider $\Pi_2$, specialized in war games, are not included in the list of selections offered to gamer $\Gamma_1$.

Also, a game which contains gaming scenarios suitable for all ages, as well as adult oriented gaming situations is optionally played by all users registered to the distributed loosely coupled unified online gaming systems. According to a personal profile, however, certain gaming situations are not made available to registered users, who explicitly stated that no sexually oriented material is to be delivered to their gaming console. For this user, when experiencing a gaming situation exploring the streets of an unknown city, the door to the table dance club remains locked. This way, a great deal of parental control is exercised, and parents who subscribed to a gaming service provider specialized in educational programs do not need to worry that their children, when connecting to the distributed loosely coupled unified on-line gaming service, are exposed to doubtful and questionable material.

Although the instant invention has been described with respect to specific embodiments thereof, various changes and modifications are optionally carried out by those skilled in the art without departing from the scope of the invention. Therefore, it is intended that the instant invention encompass such changes and modifications as fall within the scope of the appended claims.

What is claimed is:

1. A computer-implemented method, comprising:
    maintaining, by central service provider located equipment, respective connections with a plurality of online service provider equipment associated with respective online service providers, wherein two or more online service provider equipment of the plurality of online service provider equipment connect using a different data format;
    receiving, by the central service provider located equipment, respective connection requests from a first group of gaming service customers, the first group of gaming service customers being subscribers of a first online service provider;
    receiving, by the central service provider located equipment, respective connection requests from a second group of gaming service customers, the second group of gaming service customers being subscribers of a second, different online service provider; and
    establishing multi-customer gaming interactions through the central service provider located equipment between the first group and the second group of gaming service customers, wherein the establishing comprises:
        connecting, by the central service provider located equipment, each gaming service customer in the first and the second groups to the gaming service customer's respective online service provider, receiving a selection of a game offered by one of the first and the second online service providers, and
        converting respective game interaction data between the first and the second online service providers using the central service provider located equipment.

2. A method according to claim 1, wherein gaming service customers subscribe to a central service provider associated with the central service provider located equipment.

3. A method according to claim 1, wherein communication between the gaming service customers and the central service provider located equipment is secured.

4. A method according to claim 1, further comprising:
    providing registration services between gaming service customers and online service providers.

5. The method according to claim 1, further comprising:
    providing a selection of gaming partners that include gaming service customers from both the first and the second groups of gaming service customers.

6. The method according to claim 5, further comprising:
    transmitting gaming data to both the first and the second groups of gaming service customers during the game.

7. The method according to claim 6, wherein converting respective game interaction data between the first and the second online service, providers using the central service provider located equipment comprises:
    performing data conversion on the game interaction data according to gaming console hardware used by the first and the second groups of gaming service customers.

8. The method according to claim 5, wherein the provided selection of gaming partners is filtered according to at least a predefined criterion specified by the gaming service customers.

9. A computer-implemented method, comprising:
    establishing, by a first gaming device, a connection to central service provider located equipment;

connecting to online service provider equipment associated with an online service provider through the central service provider located equipment; and establishing, by the first gaming device, multi-customer gaming interactions with a second gaming device through the central service provider located equipment, wherein the second gaming device is connected to a second online service provider through the central service provider located equipment, wherein the second gaming device is connected to the central service provider located equipment using a different data format than the first gaming device, the gaming interactions are for a game provided by the second online gaming service provider, and wherein respective game interaction data is converted between the first and second gaming devices using the central service provider located equipment.

10. The method according to claim 9, wherein the gaming interactions are established through messages that are filtered at the central service provider located equipment according to at least a predefined criterion.

11. The method according to claim 10, wherein the messages are filtered according to a personal profile provided by a gaming service customer to the central service provider located equipment.

12. The method according to claim 10, wherein the messages include gaming requests for gaming data to be executed on the gaming console.

13. The method according to claim 10, wherein the messages include gaming data to be executed on the gaming console.

14. A system comprising:
 central service provider located equipment connected to a plurality of online provider located equipment, wherein the central service provider located equipment comprises:
  one or more processors;
  memory coupled to the one or more processors and operable for storing instructions, which, when executed by the one or more processors, cause the one or more processors to perform operations, comprising:
   maintaining a respective connection with a plurality of online service provider equipment associated with respective online service providers, wherein two or more online service provider equipment of the plurality of online service provider equipment connect using a different data format;
   receiving respective connection requests from a first group of gaming service customers, the first group of gaming service customers being subscribers of a first online service provider in the plurality of online service providers;
   receiving respective connection requests from a second group of gaming service customers, the second group of gaming service customers being subscribers of a second, different online service provider in the plurality of online service providers;
   establishing multi-customer gaming interactions through the central service provider located equipment between the first group and the second group of gaming service customers, wherein the establishing comprises:
  connecting each gaming service customer in the first and the second groups to the gaming service customer's respective online service provider, receiving a selection of a game offered by one of the first and the second online service providers through the central service provider located equipment, and
   converting respective game interaction data between the first and the second online service providers using the central service provider located equipment.

* * * * *